May 8, 1956
R. L. BROWN
2,744,776
BRACKET FOR ASSEMBLY OF PARTS
Filed Aug. 11, 1952
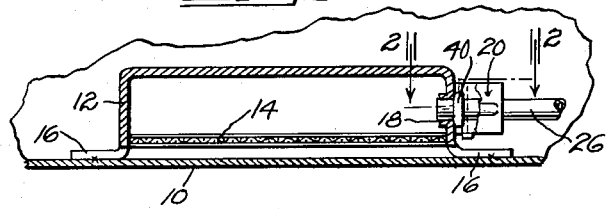
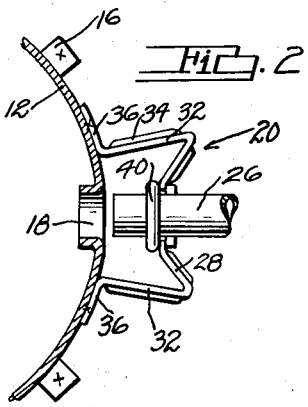
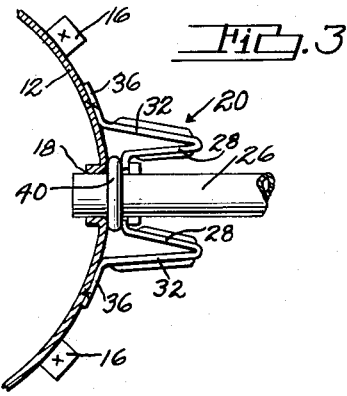
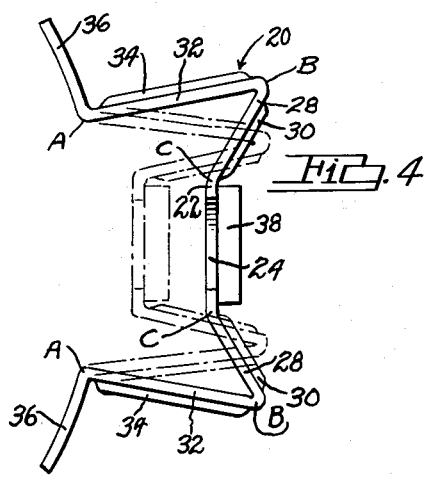
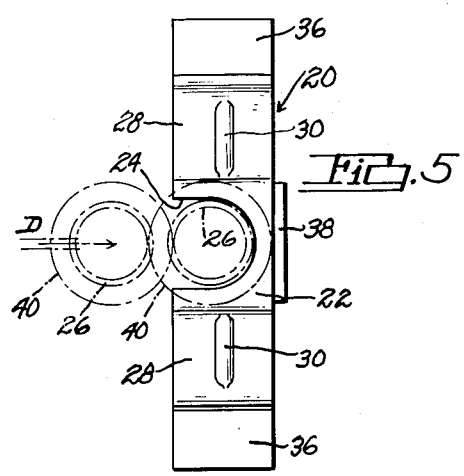
INVENTOR.
ROBERT L. BROWN.
BY
HIS ATTORNEY

United States Patent Office 2,744,776
Patented May 8, 1956

2,744,776

BRACKET FOR ASSEMBLY OF PARTS

Robert L. Brown, Ferndale, Mich.

Application August 11, 1952, Serial No. 303,771

1 Claim. (Cl. 287—20)

This invention relates to a supporting bracket for positioning and retaining a member extending through an opening in a wall. More specifically, the invention relates to a bracket which will receive a member, such as a rod or tube, and by deforming the bracket the member will be inserted into an opening in the part to which the bracket is attached, and the deformed bracket will retain the member in the part.

The invention has been illustrated in connection with the assembly of a gasoline line tube to the sump well of a gasoline tank for automobiles.

It is an object of the present invention to provide a deformable bracket which is secured to an apertured support; to provide the bracket with a tube engaging portion for receiving and positioning the tube in axial alignment with the aperture in the support; and to provide the bracket with outwardly divergent arms which may be bent toward parallel position, whereby the tube is moved axially into the aperture in the support when the bracket is deformed.

Another object of the invention is to secure a collar on the outer periphery of the tube, spaced from the free end of the tube which will form a positioning means for the tube receiving portion of the bracket.

Other objects and advantages of the invention will more fully appear from the following description taken in connection with the accompanying drawings in which:

Fig. 1 is a cross sectional view through the sump of a gasoline tank for an automobile, showing my improved bracket, partly broken away, applied to the sump;

Fig. 2 is a view taken on line 2—2 of Fig. 1 showing a portion of the sump in section, the bracket and tube being in position before final assembly;

Fig. 3 is a view corresponding to Fig. 2 but showing the bracket and tube in final assembled position;

Fig. 4 is an enlarged top plan view of the bracket, showing in full lines the shape of the bracket before deformation and in dot and dash lines the shape of the bracket after deformation; and Fig. 5 is a side elevational view of Fig. 4, showing the tube in dot and dash lines before insertion and after insertion in the tube receiving portion of the bracket.

Referring to the drawings, I have shown, for the purpose of illustrating an application of the invention, a bottom portion of a gasoline tank 10 which receives a sump 12 having a filter 14 spaced above the bottom of the tank. The sump 12 is secured to the bottom of the tank 10 by spot welding or otherwise securing tabs 16 to the bottom of the tank. The sumps are usually assembled in the tank before the tubular gasoline line is assembled and it has been found difficult to insert and retain the tube end within the sump. A flanged aperture 18 is provided in the wall of the sump for receiving the tube end of the gasoline line.

To facilitate the assembly of the gasoline line to the sump, I have provided a bracket 20, preferably formed from malleable sheet metal, which is spot welded to the outer wall of the sump 12 over the aperture 18.

The bracket 20 has a central portion 22 provided with a cut out slot 24 in one edge thereof. The width of the slot is substantially equal to the diameter of the gasoline line 26 so that the line may be slid laterally into the body of the bracket. The slot 24 terminates within the central portion 22 in a semi-circular surface, concentric to the center of the central portion 22, to position one side of the circular surface of the line concentric to the aperture 18 in the sump 12.

The opposite ends of the central portion 22 are each provided with an intermediate stiffened section 28, the stiffness being obtained by pressing a longitudinal rib 30 through the length of the section. These sections 28 are bent upwardly out of the plane of the central portion 22 originally at an obtuse angle to the central portion. Arms 32 form extensions of the sections 28 and are provided with ribs 34 for stiffening the arms against bending. The adjacent ends of the ribs 30 and 34 are spaced to provide a bending section at the junctures of the central portion 22 and the arms 32. The arms 32 are bent downwardly out of the plane of the section 28 and at an angle thereto and before final assembly the outer ends of the arms 32 are in convergent relation.

Outwardly extending tabs 36 are formed on the outer ends of the arms 32 which form securing means for the bracket 20 to the sump 12 by spot welding the tabs to the wall of the sump. The outer ends of the ribs 34 terminate short of the tabs 36 to permit bending of the arms 32 relative to the tabs 36. The bracket 20 is thus provided with bending sections A, B, and C, which will permit movement of the planes of the arms 28 and 32 with respect to each other and with respect to the tabs 36 and the central portion 22.

An outwardly bent flange 38 extends along the longitudinal edge of the center portion 22, opposite to the slotted longitudinal edge thereof. This flange provides a stiffening means for the central portion 22 so that there will be no bending of the central portion, weakened by the slot 24.

The arms, intermediate sections and the central portion are bent relative to each other forming in shape the letter M.

The gasoline line 26 is provided with a collar 40 secured to its outer periphery and is spaced axially from the outer end thereof.

To assemble the line 26 in the aperture 18 of the sump 12, the line is moved laterally, as indicated by the arrow D in Fig. 5, into the slot 24 with the collar 40 between the central portion 22 and the outer surface of the sump wall 12, as shown in Fig. 2. A tool, such as a pair of pliers, is then placed over the outer faces of the arms 32 and pressure will bend the arms and sections from the full line position of Fig. 4 to the dot and dash line position. This bending causes inward movement of the central portion 22 toward the sump wall, forcing the free end of the line 26 into the aperture 18 as shown in Fig. 3. The bracket being made of malleable material, will retain its deformed position and securely retain the end of the line 26 within the sump 12. The assembly is rapid and easily accomplished.

While I have illustrated and described a preferred embodiment of the invention, it will be understood that various changes including the size, shape and arrangement of parts may be made without departing from the spirit of the invention and it is not my intention to limit its scope other than by the terms of the appended claim.

I claim:

A bracket for the assembly of a member into an aperture in a support comprising, a sheet metal body having a central portion provided with a slot through one side thereof, an outwardly bent flange along the longitudinal edge of said central portion opposite the slotted side, integral ribbed intermediate sections at the opposite ends of said central portion, said section diverging outwardly from the plane of said central portion at one side thereof, ribbed arms at the outer ends of said intermediate sections converging inwardly and extending beyond the plane of said central portion at the opposite side of said central portion, tabs at the outer ends of said arms for securing said bracket to the support, one at each side of the aperture in the support, in combination with a member to be received in the aperture, a collar spaced from the outer end of said member, said member received in the slot with said collar abutting the side of said central portion away from the diverging sections and in axial alignment with the opening in the support, whereby application of pressure on the outer surfaces of said arms will produce an approach of said central portion to force the outer end of said member through the aperture in the support by the bending and approach of said arms and said intermediate sections in side by side relation.

References Cited in the file of this patent

UNITED STATES PATENTS

| | | |
|---|---|---|
| 2,100,017 | Van Uum | Nov. 23, 1937 |
| 2,267,379 | Tinnerman | Dec. 23, 1941 |
| 2,275,127 | Brown | Mar. 3, 1942 |
| 2,332,852 | Johnson | Oct. 26, 1943 |
| 2,618,193 | Peckham | Nov. 18, 1952 |

FOREIGN PATENTS

| | | |
|---|---|---|
| 416,954 | France | Aug. 19, 1910 |